United States Patent [19]

Hwo et al.

[11] Patent Number: 4,886,849

[45] Date of Patent: Dec. 12, 1989

[54] BUTENE-1 MOLDING RESIN BLENDS

[75] Inventors: Charles C. Hwo, Sugar Land, Tex.; Patrick M. Hughes, Clinton, N.J.

[73] Assignee: Shell Oil Company, Houston, Tex.

[21] Appl. No.: 316,387

[22] Filed: Feb. 27, 1989

Related U.S. Application Data

[63] Continuation-in-part of Ser. No. 161,872, Feb. 29, 1988, abandoned.

[51] Int. Cl.$^4$ .................. C08L 23/18; C08L 23/12; C08L 23/06; C08K 5/00
[52] U.S. Cl. .................................... 524/263; 524/261; 524/315; 524/323; 524/345; 524/394; 524/528; 525/240
[58] Field of Search ................ 525/240; 524/263, 528

[56] References Cited

U.S. PATENT DOCUMENTS

| | | | |
|---|---|---|---|
| 3,372,049 | 3/1968 | Schaffhausen | 117/7 |
| 3,455,871 | 7/1969 | Coover et al. | 260/41 |
| 3,634,551 | 1/1972 | Stancell et al. | 260/897 |
| 3,733,373 | 5/1973 | McConnell et al. | 260/897 |
| 3,808,304 | 4/1974 | Schirmer | 264/289 |
| 3,836,607 | 9/1974 | Finkmann et al. | 260/897 |
| 4,075,290 | 2/1978 | Denzel et al. | 260/897 |
| 4,316,970 | 2/1982 | Hughes | 525/240 |
| 4,354,004 | 10/1982 | Hughes et al. | 525/240 |

FOREIGN PATENT DOCUMENTS

| | | |
|---|---|---|
| 633823 | 1/1962 | Canada ............................... 525/240 |
| 1292379 | 4/1969 | Fed. Rep. of Germany . |
| 1570353 | 4/1971 | Fed. Rep. of Germany . |
| 1468240 | 2/1965 | France . |

OTHER PUBLICATIONS

Poly(1—Butene)—its Preparation and Properties, by I. D. Rubin, Publ. by Gordon and Breach, N.Y., 1968, p. 71.
Polymers Handbook, Publ. by Bandrup and Immergut, N.Y., 1975, Sec. IV-7.

Primary Examiner—Carman J. Seccuro

[57] ABSTRACT

A composition consisting essentially of a blend of about 60 to 75% by weight of an isotactic butene-1 homopolymer with a melt index of more than 100 to 1000, about 23.5 to 39.88% by weight of stabilized propylene polymer, and about 0.02 to 1.5% by weight of high density polyethylene, and optionally, up to 0.1 to 1% of a mold release agent and articles prepared therefrom.

33 Claims, No Drawings

BUTENE-1 MOLDING RESIN BLENDS

This is a continuation-in-part of U.S. Ser. No. 161,872, filed Feb. 29, 1988, now abandoned.

FIELD OF THE INVENTION

This invention relates to improvements in compositions for the production of high melt flow (greater than 100 to 1000 MI) butene-1 based articles, including molded articles, from blends of butene-1 homopolymer, stabilized propylene polymer, high density polyethylene, and certain other additives.

CROSS REFERENCE TO RELATED APPLICATION

This application is directed to an improvement over the invention of U.S. Pat. No. 3,733,373.

BACKGROUND OF THE INVENTION

It has recently been discovered that a 50–75 wt % blend of butene-1 homopolymer (PB) (with a melt index greater than 100 and less than 1000), about 23.5 to 39.88% by weight of stabilized propylene polymer (PP) and 0.02 to 1.5 high density polyethylene may be used for the production of a molded article which has an excellent overall balance of properties including improved cycle time. Improved cycle time can be defined as a shorter time required for molding after extrusion than for usual types of blends.

In U.S. Pat. No. 3,733,373 to McConnell et al., the invention is directed to improving the usefulness of butene-1 homo- or copolymers as molding resins. In molding these resins, the polymer crystallizes out of the melt as a soft, clear plastic (Form II polybutylene crystallization) and then gradually changes to the more thermodynamically stable Form I. The patentees state that during this transformation the molded objects are tacky and warp and become cloudy, and that the molded object tends to be so soft that the knock-out pins of the mold tend to puncture the molded parts. The patentees disclose that addition of high or medium density polyethylene substantially increases the crystallization temperature of the poly-1-butene and permits the blends to mold extremely well and to be released from the mold without being punctured or dented by the knock-out pins. A concentration range of 0.1–30% by weight of ethylene polymer is disclosed as useful. The increase in crystallization point, measured by Differential Scanning Calorimetry (DSC) is used in the examples as a measure of effectiveness of the additive. However, the addition of polypropylene to the blends of the patent is not disclosed.

U.S. Pat. No. 3,455,871 issued to Coover, assigned to Eastman Kodak Co., describes substantially crystalline homopolymer and copolymers of 1-butene as a concentrate carrier for non-olefinic additives. The Coover patent does not claim or describe the same kind of material as used in the present invention. Coover claims a butene-1 material with an intrinsic viscosity in the range 0.2 to 5.0. The present invention has properties different from the Coover material.

The compositions according to this invention comprise a blend of about 60–75% by weight of an isotactic butene-1 homopolymer with a melt index greater than 100 and less than 1000, about 23.5–39.8% by weight of stabilized isotactic propylene, and about 0.05 to 1.5% by weight of high density polyethylene and a small but critical amount of a mold release agent to provide a material with improved cycle time, up to 20% improvement (i.e. at least 20% reduction in the cycle time) as compared with known art.

SUMMARY OF THE INVENTION

The present invention relates to compositions prepared from a blend of about 60 to 75% by weight of an isotactic butene-1 homopolymer having a melt index of more than 100 and less than 1000, about 23.5 to 39.8% by weight of stabilized propylene polymer, about 0.02 to 1.5% by weight of high density polyethylene, and optionally up to about 1% by weight of a mold release agent and articles prepared from these blends.

DETAILED DESCRIPTION OF THE INVENTION

The term isotactic polybutene-1 as used herein refers to a polybutene-1 containing at least 95%, preferably at least 97% and especially at least 98% by weight of isotactic portions. Suitable polybutenes have a density of 0.914–0.919, preferably 0.916–0.919 and especially 0.917–0.919. Suitable polybutenes have melt indexes of more than 100 to 1000. Polybutene-1 having melt indices of 200 are considered particularly useful herein. The butene-1 component melt index referred to herein is determined by ASTM D1238 Condition E.

Suitable polybutenes can be obtained, for example, in accordance with Ziegler-Natta low-pressure polymerization of butene-1, e.g. by polymerizing butene-1 with catalysts of $TiCl_3$ or $TiCl_3.AlCl_3$ and $Al(C_2H_5)_2CL$ at temperatures of 10°–50° C., preferably 20°–40° C., e.g. according to the process of German Published Application No. 1,570,353, and then further processing the polymer in accordance with conventional methods, e.g. according to processes of German Published Applications Nos. 1,292,379 and 1,570,337.

The composition of the invention can contain from about 50–80% by weight of an isotactic butene-1 homopolymer with a melt index of more than 100 to 1000, preferably 60–75% by weight of the butene-1 homopolymer. More preferably, 65–70% by weight of butene-1 homopolymer is found usable herein, and most preferably, 68.5% by weight of the butene-1 component is usable. Product PBO800 with a melt index of 200 available from the Shell Chemical Co. of Houston, Tex. is a preferred component for use in the novel formulation.

The stabilized propylene polymer used in the blends of this invention is a propylene homopolymer or copolymer with a melt flow of less than 60, more preferably from about 1 to 15, as measured by ASTM D1238, Condition L. Since melt flow and molecular weight of propylene, homopolymers, and copolymers are inversely related; the corresponding molecular weight for a polymer with a given melt flow may be readily determined by routine experimentation. A particularly suitable propylene, for example, has a melt flow of about 12, a weight average molecular weight (determined by gel permeation chromatography) of about 318,000 and a density of 0.903 grams/$cm^3$. A wide variety of suitable propylene polymers are commercially available with densities of at least 0.900 g/$cm^3$. Methods for the preparation of these polymers are well known in the art. A propylene polymer with a viscosity at mixing temperatures approximating that of the butene-1 homopolymer is preferred, in order to facilitate mixing of the formulation. Mixing may be accomplished, for example, by blending butene-1 homopolymer having a melt index of 20 with a 12 melt flow propylene homopolymer. "PP" refers to propylene polymers of the type described herein. Propylene polymer 5820 with a melt flow of 12, available from Shell Chemical Co. of Houston, Tex., is a preferred PP component usable in the novel formulation.

Within the scope of the present invention, the propylene homopolymer should be stabilized, such as with a small amount of Irganox 1010, dimethyl thiopropionate, BHT or ionol, calcium stearate, and/or mixtures thereof.

The amount of propylene polymer blended with the butene-1 homopolymer is critical to obtain improved cycle time in the formulation. The compositions of the invention can contain from about 23.5–39.8% by weight, preferably about 25 to 35% by weight, still more preferably about 30% by weight of the propylene polymer. Propylene addition at certain levels within the range described may optimize certain properties but not others. The most preferred level of about 30% propylene polymer represents the level at which the compositions exhibit the best overall improved property balance.

The high density polyethylene (HDPE) employed in the novel formulations of this invention can be characterized as having a density above about 0.941 g/cc and preferably at least about 0.950 g/cc. An HDPE with a melt index of from about 0.1 to 20, as measured by ASTM D1238, Condition E, is typically employed HDPE with higher melt indices may also be suitable herein since the melt index and molecular weight of HDPE are inversely related, the corresponding molecular weight for a particular HDPE with a given melt index may be readily determined by routine experimentation. A particularly suitable HDPE, for example has a melt index of 0.45 g/10 min., a weight average molecular weight of about 166,000 and a density of 0.950 grams/cm$^3$. Other preferred HDPE usable herein have a density of 0.941 g/cm$^3$ or 0.945 g/cm$^3$. A high density polyethylene with a suitable viscosity at mixing temperatures approximating that of the butene-1 homopolymer facilitates mixing of the components. A wide variety of suitable high density polyethylenes are commercially available and methods for their preparation are well known in the art. Commercially available HDPE may be prepared by polymerization processes employing Ziegler type coordination catalysts or supported chromium oxide catalysts. Commercially available HDPE of either type is suitable. Dupont's Alathon 7815 is a preferred HDPE for use in the novel formulation.

The benefit of HDPE incorporation is apparently due to a crystal nucleating effect. Only very small amounts of HDPE are required to provide the desired beneficial effects. If properly blended, as the proportion of HDPE in a polymer matrix of butene-1 homopolymer and small amounts of stabilized propylene polymer should be in the range from 0.02 to 1.5% by weight. 0.1–1.2% by. weight HDPE; and more particularly, 1.0% by weight HDPE can be used to obtain good results.

If desired, various mold release agents, conventional fillers, thermal and ultraviolet stabilizers, processing agents, slip agents, antiblock agents, nucleating agents, pigments and/or other additives may be incorporated in the polymers before, during; or after the blending operation. The effect of the various additives on certain properties of the composition may or may not make their presence desirable, depending in part on the contemplated end use. For example, the presence of certain mold release agents, such as silicone-based mold release agents like Dynamar PPA-791, available from 3M, can be used in amounts from 0.1–1% by weight or more preferably 0.3–0.7% by weight, and most preferably 0.5% by weight, in the novel formulation. Alternatively, fluorosilicone-based mold release agents may be used herein.

The method of combining high melt index PB with PP, HDPE and mold release agents significantly affects the properties of the resultant formulation. For commercial utility, it is desired to use the least amount of energy to combine the components into an effective blend, i.e, a blend in which the HDPE in a masterbatch is to be added to the major portion of PB prior to, or together with, the PP, or alternatively by incorporating HDPE in the PB before PP is added. For commercial practice, a masterbatch of HDPE and Dynamar PPA-791 in PB may be prepared in an intensive mixing device such as a twin-screw extruder and incorporated in PB by passing PB through an extruder coupled with a side-arm extruder through which the masterbatch is added. An alternative method is to employ an extruder provided with two side-arm extruders; wherein HDPE and Dynamar PPA-791 are injected through the first side-arm and PP is injected through the second side-arm extruder. Other intensive mixing devices, such as Banbury mixers, may be employed to make the masterbatch. The principle to be observed is to avoid incorporation of HDPE and Dynamar PPA-791 in the PP, as would occur if a masterbatch of HDPE and Dynamar PPA-791 in PP were employed, and as would occur, at least in part, if HDPE and Dynamar PPA-791 and PP were added simultaneously through a single side-arm extruder.

After blending, the compositions of this invention can be formed on conventional manufacturing equipment, e.g., blow molding equipment. The compositions can be formed into a variety of shapes with cross-sectional thicknesses (gauge) of, for example, about 20 to 300 mils. Typical parts include garage door openers, spouts for inflatable bags, injection blow molded liquid containers or other types of containers. Other types of molded articles may be prepared.

Preferred methods for converting compositions of this invention into blow molded bottles are disclosed in U.S. Patent 4,354,004. The compositions can be processed on equipment designed for manufacture of polypropylene articles, substantially in the same manner as other commercially molded polymer articles.

EXAMPLES

Formulation 1

A formulation usable herein can be:
68.5% by weight of PBO800 (WBS-608), an isotactic butene-1 homopolymer having a melt index of 200, available from Shell Chemical Co. of Houston, Tex.;
30.0% by weight PP5820;
1.0% by weight HDPE Alathon 7815; and
0.5% by weight, Dynamar PPA-791.

TABLE I

| | Typical Physical Properties | | | |
|---|---|---|---|---|
| | ASTM | Unit | | |
| | Test Method | English | (Metric) | DP0800 |
| Melt Index | | | | |
| @ 190° C. | D1238 "E" | — | g/10 min | 200 |
| @ 210° C. | D1238 "L" | — | g/10 min | 450 |
| Density | D1505 | lb/ft | g/cm$^3$ | 57.1(0.915) |
| Tensile strength @ yield | D638 | psi | MPa | 2000(13.8) |
| Tensile strength @ break | D638 | psi | MPa | 4200(29.0) |
| Elongation at break | D638 | % | % | 350 |
| Modulus of elasticity | D638 | psi | MPa | 35000(241) |
| Hardness, Shore | D2240 | D scale | D scale | 55(55) |
| Brittleness temperature | D746 | °F. | °C. | 0°(18°) |
| Melting point range | DSC | °F. | °C. | 255–259° (124–126°) |
| Soft point, Vicat | D1525 | °F. | °C. | 241°(116°) |
| Thermal conductivity, at 77° F. | C177 | Btu/ft$^2$/ hr/°F./in | Kcal/m$^2$ hr/°C./cm | 1.25 (16) |

Formulation I was prepared from: 30 percent by weight PP5820, available from Shell Chemical Co. of Houston, Tex. (a polypropylene homopolymer) and 68.5 percent by weight PBO800 a butene-1 homopolymer also known as WBS608 having a melt index of 200 (a polymer of Shell Chemical Co. of Houston, Tex.). 1.0 percent by weight High Density Polyethylene known as Alathon 7815, and 0.5 percent by weight Dynamar PPA-791 were also used. Formulation I was prepared by dry tumbling PP5820 with PBO800 for about 1 hour in a drum at room temperature. The dry tumbled blend was placed in a 1¼" single stage single screw Brabender extruder, with the screw having a mixing head disposed thereon. The Alathon 7815 and Dynamar PPA-791 were added to the dry tumble mixture. The compounding was run at a temperature between 420° F. and 450° F. and the mixture was given a residence time of about 5 minutes in the extruder. The mixture was extruded into a strand, cooled and chopped into pellets using conventional techniques. Molded articles were then prepared from the pellets.

It is expected that this formulation can be used for injection molded parts and these parts will have better moldability using the high melt flow (high melt index) butene-1 material than the low melt flow material. It is expected that using PB0800 material the moldability will flow twice as fast as the low melt index (20 MI) material. The high melt flow material flows better into the cavity of the mold than the low melt flow butene-1 material.

What is claimed is:

1. A composition consisting essentially of a blend of about 60 to 75% by weight of an isotactic butene-1 homopolymer with a melt index of more than 100 to 1000, about 23.5 to 39.88% by weight of stabilized propylene polymer, and about 0.02 to 1.5% by weight of high density polyethylene.

2. The compposition of claim 1 consisting essentially of a blend of about 65 to 70% by weight of an isotactic butene-1 homopolymer with a melt index of more than 100 to 225.

3. The composition of claim 1 consisting essentially of a blend of about 68.5% by weight of an isotactic butene-1 homopolymer with a melt index of more than 100 to 225.

4. The composition of claim 1 further consisting essentially of a blend of about 25 to 35% by weight a stabilized propylene polymer.

5. The composition of claim 1, further consisting essentially of a blend of about 30% by weight of a stabilized propylene polymer.

6. The composition of claim 1, further consisting essentially of about 0.1–1.2% by weight of a high density polyethylene.

7. The composition of claim 1 further consisting essentially of about 1.0% by weight of a high density polyethylene.

8. The composition according to claim 1, prepared by blending the polyethylene component with the major portion of the composition in the form of a masterbatch of said polyethylene in said isotactic butene-1 homopolymer.

9. The composition according to claim 1, further consisting of about 0.1 to 1% by weight of a mold release agent.

10. The composition according to claim 1, further consisting of about 0.3 to 0.7% by weight of a mold release agent.

11. The composition according to claim 1, further consisting of about 0.5% by weight of a mold release agent.

12. The composition of claim 1, further consisting of a silicon-based mold release agent.

13. The composition of claim 1 further consisting of a fluorosilicone-based mold release agent.

14. The composition of claim 1, wherein the propylene polymer is stabilized with at least one member of the group of a hindered phenol, dimethylthiopropionate, BHT, calcium stearate, and mixtures thereof.

15. The composition of claim 1, wherein the propylene polymer is a homopolymer having a melt index of 60 or less.

16. The composition of claim 1, wherein the propylene polymer has a density of at least 0.900 g/cm$^3$.

17. The composition of claim 1, wherein the polyethylene has a density of at least 0.941 g/cm$^3$.

18. A molded article prepared from a composition consisting essentially of a blend of about 60 to 75% by weight of an isotactic butene-1 homopolymer with a melt index of more than 100 to 225, about 23.5 to 39.88% by weight of stabilized propylene polymer and about 0.02 to 1.5% by weight of high density polyethylene.

19. The molded article of claim 18 prepared from a composition further consisting essentially of a blend of about 65 to 70% by weight of an isotactic butene-1 homopolymer with a melt index of more than 100 to 225.

20. The molded article of claim 18 prepared from a composition further consistin essentially of a blend of about 68.5% by weight of an isotactic butene-1 homopolymer with a melt index of more than 100 to 225.

21. The molded article of claim 18, prepared from a blend further consisting essentially of about 25 to 35% by weight of a stabilized propylene polymer.

22. The molded article of claim 18 prepared from a blend further consisting essentially of about 30% by weight of a stabilized propylene polymer.

23. The molded article of claim 18 prepared from a blend further consisting essentially of about 0.1–1.2% by weight of a high density polyethylene.

24. The molded article of claim 18 prepared from a blend further consisting essentially of about 1.0% by weight of a high density polyethylene.

25. The molded article of claim 18, further consisting essentially of about 0.1 to 1% by weight of a mold release agent.

26. The molded article of claim 18, further consisting essentially of about 0.3 to 0.7% by weight of a mold release agent.

27. The molded article of claim 18, further consisting essentially of about 0.5% by weight of a mold release agent.

28. The molded article of claim 18 further consisting of a silicon mold release agent.

29. The molded article of claim 18 further consisting of a fluorosilicone-based mold release agent.

30. The molded article of claim 18, wherein the propylene polymer is stabilized with at least one member of the group: a hindered phenol, dimethyl propionate, BHT, calcium stearate, and mixtures thereof.

31. The molded article of claim 18, wherein the propylene polymer is a homopolymer having a melt index of 60 or less.

32. The molded article of claim 18, wherein the propylene polymer has a density of at least 0.900 g/cm$^3$.

33. The molded article of claim 18, wherein the polyethylene has a density of at least 0.941 g/cm$^3$.

* * * * *